June 16, 1953 B. COOPER 2,641,919

INTERLOCK SYSTEM

Filed Jan. 11, 1950 2 Sheets-Sheet 1

INVENTOR
BENJAMIN COOPER
BY J. B. Felshin
ATTORNEY

June 16, 1953 B. COOPER 2,641,919

INTERLOCK SYSTEM

Filed Jan. 11, 1950 2 Sheets-Sheet 2

INVENTOR
BENJAMIN COOPER
BY J. B. Felshin
ATTORNEY

Patented June 16, 1953 2,641,919

UNITED STATES PATENT OFFICE 2,641,919

INTERLOCK SYSTEM

Benjamin Cooper, New York, N. Y.

Application January 11, 1950, Serial No. 137,976

4 Claims. (Cl. 70—338)

This invention relates to mechanical interlock systems. It is particularly directed to an interlock for use in connection with key identifier units of the type used in registers, watchman systems, toll checking apparatus and similar systems wherein an identification record is automatically made of the particular identifier key used to operate the identifier mechanism.

In order to prevent unauthorized tampering with equipment, such as recording apparatus, associated with key identifier mechanisms, it is usual to provide enclosing and locking means independent of the identifier key itself for such apparatus. In such systems the key for the protecting lock or locks can be surreptitiously used or duplicated for use to expose the mechanism to tampering without furnishing a clue as to how or when the unit was opened.

It is accordingly an object of this invention to provide a mechanical interlock of the character described that can be unlocked only by the cooperative use of a special identifier key and a cylinder lock key or master key.

It is another object of this invention to provide, in a mechanical interlock of the character described, for the use of the identifier means in the device locked to record identification of the special unlocking identifier key used.

It is a further object of this invention to provide a mechanical interlock of the character described that holds a cylinder lock key or master key in a cylinder lock when the interlock is locked, and which, when a special unlocking identifier key is used, allows the removal of the master key for use in unlocking protected enclosures and at the same time operates to prevent the special unlocking identifier key from being removed until the master key is again locked in its lock.

It is a further object of this invention to provide a fool-proof, tamper-proof interlocking means of the class described that is simple and effective, yet comparatively inexpensive, practical and efficient to a high degree in use.

Other objects of this invention will, in part, be obvious and in part hereinafter pointed out.

In brief, I accomplish the foregoing objectives by the use of an identifier key especially designed to cooperate with the identifier mechanism and a cylinder lock and key such that the cylinder lock key, or master key, being normally held in its lock, can only be removed for use in unlocking the encasement enclosing other equipment or, for instance, the identifier unit encasement itself, or guarded compartments or rooms (locked by means of other similar cylinder locks), after the special identifier key has first been used, thereby having registered and continuing to register its identification number and other pertinent information that the identifier might be equipped to record, until the master key is against locked in its interlocking cylinder lock and the special identifier key is thereafter removed.

The invention accordingly consists of the features of construction, combinations of elements, and arrangements of parts which will be exemplified in the construction hereinafter described, and of which the scope of application will be indicated in the appended claims.

In the accompanying drawing, in which is shown one of the various possible illustrative embodiments of the invention:

Figures 1, 2, 3, 4, 5, 6, 7:
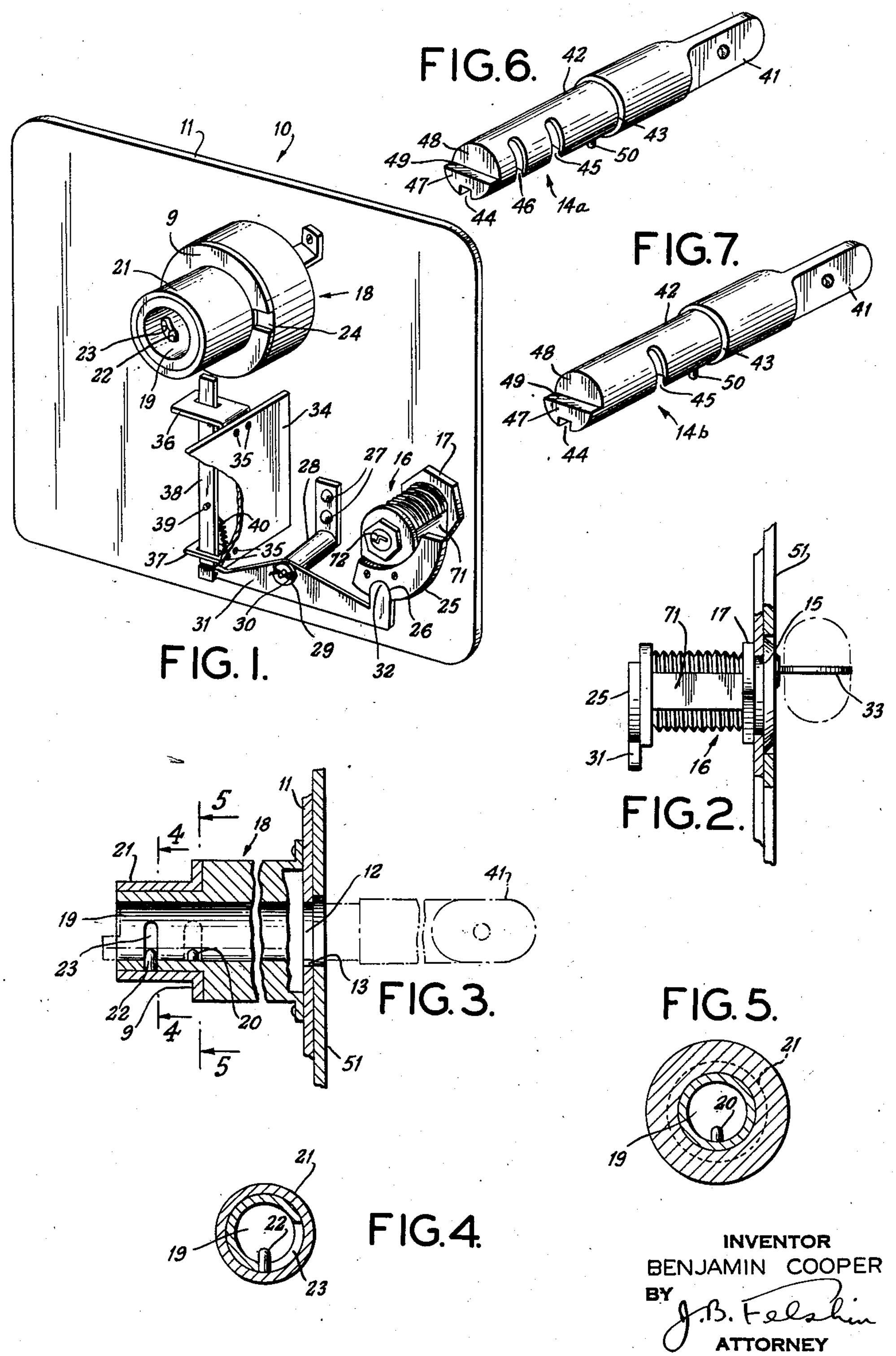
Fig. 1 is a perspective view of a portion of a key identifier unit embodying the invention.
Fig. 2 is a side elevational view of the cylinder lock on an identifier unit.
Fig. 3 is an elevational side cross-sectional view of an identifier lock.
Fig. 4 is a cross-sectional view taken on line 4—4 of Fig. 3.
Fig. 5 is a cross-sectional view taken on line 5—5 of Fig. 3.
Fig. 6 is a perspective view of an operator's identification key.
Fig. 7 is a perspective view of a maintainer's identification key, or master identification key.

Referring now in detail to Fig. 1, 10 shows the embodiment of a mechanical interlock in a key identifier unit. The construction and operation of the key identifier unit itself is fully disclosed in applicant's U. S. Patent No. 2,325,744 issued August 3, 1943, and only so much of its operation will be shown and described here as is necessary to bring out adequately the functioning of the interlock system.

Briefly, identifier units are characterized by their application of operation in which a person using such units or dependent apparatus, is positively identified. Special keys, conventionally termed "identifier keys," are issued to personnel authorized to operate or use the said apparatus and an accurate record of their distribution is maintained. Any one of such keys, when inserted in the identifier unit, actuates means which records the number or other identifying indicia particular to that key. Thus, with the person issued said key being known, consequently the user of the key is readily ascertained.

In the key identifier unit, there is a front plate 11 formed with a circular opening 12, having a downwardly extending keyway 13, said opening with its keyway being adapted to receive identification keys 14*a* and 14*b* to be described in detail hereinafter. There is in plate 11 another circular opening 15, supplied to receive cylinder lock 16 comprising cylinder lock barrel 71 and cylinder member 72 mounted as by nut 17 so as to be operated by its key 33, the master key, from the front of said plate.

Attached to the rear of plate 11 and extending rearwardly therefrom is a cylindrical member 18. Said member has a bore 19 of substantially the same diameter as the opening 12 and coaxial therewith. Fixed to the inside of said member 18 and within bore 19 is a pin 20 aligned with the keyway 13 and projecting upwardly. Rotatably mounted on the rearward end of said member 18 is a sleeve 21 to which is affixed a diametrically and inwardly extending pin 22, positioned in slot 23 and movable therein when said sleeve is rotated with respect to said member.

When viewed from the rear of member 18, slot 23 extends peripherally around said member from the bottom thereof clockwise through an angle of about 90° with respect to the common axis, thereby constraining pin 22 together with its integrally connected sleeve 21 to rotational movement of about 90° with respect to said member.

Sleeve 21 has further a slot 24 in its flange portion 9 extending from its periphery inward, approximately rectangular in shape and symmetrical about a diameter of said sleeve. Slot 24 is positioned 90° out of alignment with respect to pin 22 relative to the common axis and in a counter-clockwise direction as viewed from the rear of said sleeve. It is evident therefore that when sleeve 21 is rotated its full 90° clockwise about member 18, slot 24 will have moved to a downwardly facing position.

Cylinder lock 16 has affixed to its rotatable cylinder an arcuate member 25 furnished with a semi-circular cutout 26 in its outer curved edge.

Front plate 11 has rearwardly mounted and affixed to it, as by rivets 27, a pivot stud 28, positioned in a vertical plane perpendicular to plate 11 and approximately midway between the axis of cylindrical member 18 and cylinder lock 16 and in a horizontal plane slightly below the horizontal diameter at cylinder lock 16. Rotatably mounted on said pivot member and held thereon as by washer 29 and cotter-pin 30 is a pivot arm 31 substantially in a common plane with slot 24 and arcuate member 25, said plane being practically in parallel space relationship with respect to plate 11.

Said pivot arm extends substantially horizontally and equidistant in each direction from its pivot member 28 and has a "cylinder lock" end and another end, having at its "cylinder lock" end an upwardly facing, semi-circular portion 32 corresponding with and positioned to be received by cutout 26 when said cutout is in a downwardly facing position. Said cutout will be so disposed only when the lock cylinder is in a position as represented by master key 33, being in the lock in a horizontal position, as in Fig. 2. Said key in this position is locked in and cannot be removed.

Plate 11 further has vertically and perpendicularly affixed thereto a mounting plate 34 (partially shown) positioned to extend rearwardly and below and to the right of the vertical center of cylindrical member 18. Said mounting plate has affixed near its upper and lower edges, as by machine screws 35, brackets 36 and 37 positioned and equipped with rectangular openings in their horizontal surfaces and mounted to serve as guides for slidably mounted bar 38. Said bar is thus substantially held in the common plane with slot 24, cutout 26 and pivot arm 31 and in a vertical plane through the axis of cylindrical member 18.

The upwardly extending end of bar 38 is of a corresponding size and shape with slot 24 so as to be slidable therein when said slot is in a downwardly extending position. When said slot is not in a downward position, said bar is restricted in its upward motion by the interfering annular flange on sleeve 21.

The lower end of said bar has a flat, horizontal surface which is in alignment with and abuts a similar surface on said other end of pivot arm 31. Said bar also has mediately positioned along its length and riveted thereto, a stud 39 adapted to hold one end of spring 40. The other end of said spring is affixed in a hole in lower bracket 37. Being under tension, said spring thereby tends to hold bar 38 downwardly and in contact with pivot arm 31.

The keys 14*a* and 14*b*, shown in Figs. 6 and 7, will now be described. Key 14*a* is known as an "operator's key" and is used in the ordinary operation of the identifier unit and its associated equipment. Key 14*b* is known as a "maintainer's key," or master identification key. These two types of key differ only slightly as will be pointed out below.

Key 14*a* has a flat diametric handle 41 at its rearward end and is formed at its forward end with a substantially cylindrical portion 42 of a somewhat reduced diameter. At the forward end of the cylindrical portion 42 is an annular shoulder 43. The cylindrical portion 42 is formed with a longitudinal slot 44. Mediately the ends of said cylindrical portion is a peripheral slot 45 communicating with the groove on slot 44 and extending to an angle of about 90° with respect to the axis of the key in a clockwise direction as faced from its forward end. Somewhat forward of peripheral slot 45 is another similar peripheral slot 46. The forward end of said key has two semicircular shoulders, 47 and 48, forming a flat surface 49, through the axis of the key. The positions of said semicircular shoulders determine the key's particular identification number. The groove 44 is in alignment with the lower edge of flattened handle 41. Fixed to said key is a radially outwardly projecting pin 50 in alignment with the groove 44 and disposed rearwardly of shoulder 43.

The "maintainer's key" or master identification key 14*b* differs in construction from the operator's key 14*a* only in that it does not have a peripheral slot 46. It is to be understood, however, that the semicircular shoulders 47 and 48 vary in distance along the axis from key to key so that each key has its individual identification number.

The operation of the interlock system is as follows: A master identification key is inserted into the opening 12 of the identifier with the handle 41 in a vertical position as shown in the dashed line in Fig. 3. The pin 50 thus passes through the key slot 13. Pins 20 and 22 are received within the groove 44 of the key. When the key is fully inserted, the pin 20 is aligned with the peripheral slot 45 of the key. The key is then turned approximately 90° in a clockwise direction (looking to the rear of the identifier, as in Fig. 1) to its operating position. As soon as the key is thus inserted and fully turned, a print is automatically taken, recording the key's identification number. It should now be noted that the master identification key has, in being turned 90° in its lock, carried around with it pin 22 and its integrally connected sleeve 21 so that slot 24 is in a downwardly extending position. It is only when said sleeve is in this position that the cylinder lock key 33 can be removed from its lock. This is accomplished by action of the interlock mechanism as follows: Turning the key 33 in a clockwise direction, viewed as in Fig. 1, causes semicircular cutout 26 to move against rounded portion 32 of pivot arm 31 so as to displace it downwardly. The corresponding motion of said other end of said pivot arm imparts an upward movement to slide bar 38, moving it into slot 24. When the bar is in this position, it should be noted that the master identification key cannot be turned, so as to be removed from the identifier. The cylinder lock key 33 can now be removed after turning it approximately 90° so that it is in a vertical position.

It should also be noted that when an operator's key is used its extra slot 46, which, when the key is in a turning position, is aligned with pin 22, provides a clearance for said pin upon its being turned. Because of this, sleeve 21 is not rotated, the pivot arm 31 cannot be sufficiently moved and the cylinder lock key 33 cannot be turned and removed from its lock.

It is now evident that the cylinder lock key 33 cannot be removed except by the use of a master identification key 14b. Moreover, once locked in, neither is the master identification key 14b removable until the cylinder lock key 33 is returned to and locked in its lock. Since the use and removal of the master indentification key 14b automatically causes registration of the time and the particular key's identification number, it is evident that the identifier system itself serves as a "watchman" over the use of the cylinder lock key, or master key, 33 while it is removed.

The cylinder lock key 33 is thought of as a master key since it may be used to unlock, by means of similar locks, any or all locked units of the identification system, or any other system.

Figure 8:
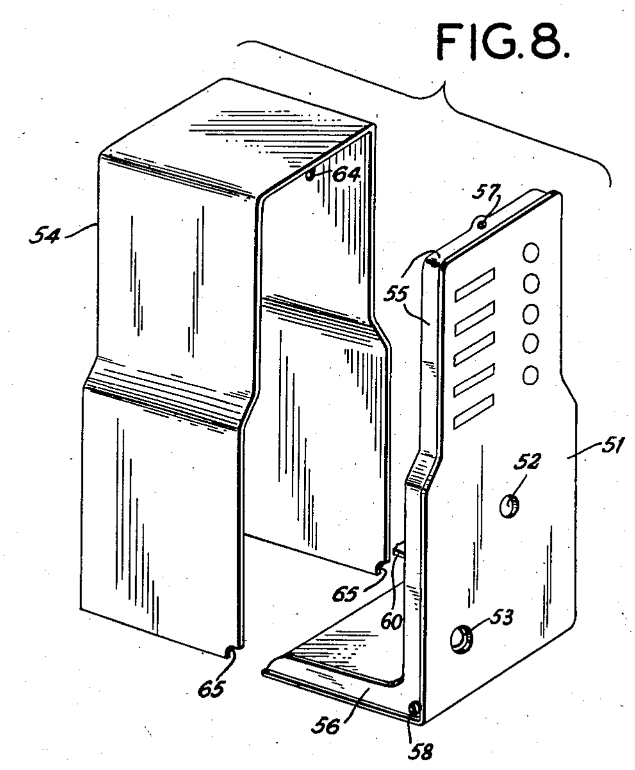
Fig. 8 is a perspective view showing an identifier frame and cover.
Figure 9:
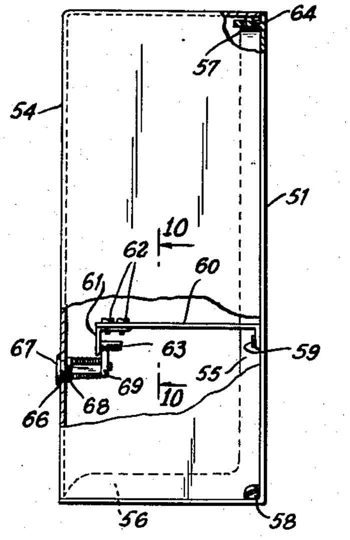
Fig. 9 is a side elevational cross-sectional view of an identifier frame with the cover in place.
Figure 10:
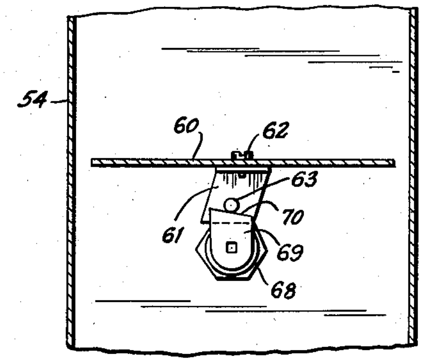
Fig. 10 is a cross-sectional view taken on line 10—10 of Fig. 9.

Figs. 8, 9 and 10 show the embodiment of this invention as applied to locking a protective cover on a combination identifier-keybox unit such as is used in traffic toll checking systems. In this instance, the identifier unit, not shown in these figures, is located near the bottom of the frame 51 and is positioned to be operated through the keyholes 52 and 53. The upper part of frame 51 is used to support a vehicle classification keybox, not shown.

Frame 51 has a protective cover 54 designed to fit snugly with and to enclose the back of said frame and to be locked thereto. Said frame has around its side edges and top edge rearwardly extending undercut shoulders 55 and along its rear bottom edges upwardly extending undercut shoulders 56.

Frame 51, further, has centrally located in its top shoulder a locating hole 57 and has also a pair of machine screws 58, one located in each side of said frame at the intersection of said bottom and side shoulders, said screws being tightly screwed is only far enough to allow the cover edges to be slid between the underside of the heads of said screws and said bottom and side undercut shoulders.

Frame 51 also has affixed to the rear thereof and extending rearwardly, as by screws 59, a bracket 60 adapted to support a locking part 61 held thereto at the rearward end of said bracket as by screws 62. Said locking part has the shape of a 90° angle iron and in its mounted position has one of its angle arms extending inwardly and the other extending downwardly. The downwardly extending arm has approximately centrally located and securely affixed thereto a round inwardly extending stud 63.

Cover 54 has two sides, a top and a back integrally fabricated. In the top near the front and centrally located along the front is a downwardly extending locating pin 64 designed to register with and engage in locating hole 57 when said cover is properly placed on frame 51. Cover 54 further has, in its lower front side corners, arcuate cutouts 65 designed for clearance around the threaded part of the two screws 58. Said cutouts are small enough, however, for said sides to be held in under the heads of said screws when cover 54 is properly in place. Cover 54 is further equipped with a hole 66 in the back to accommodate a tumbler lock 67 mounted therein in an inwardly extending direction as by nut 68. Said lock has affixed to the rearward end of its movable cylinder a locking arm 69 having a tapered edge 70. As hereinbefore mentioned, lock 67 is similar to lock 16 in that it is operative by the common cylinder lock key, 33.

Cover 54 is locked to frame 51 by first placing it properly on the frame, i. e. with locating pin 64 in place in locating hole 57 and the lower part of said cover placed firmly downwardly and inwardly against frame 51. Now, referring to Fig. 10, it can be seen that as the lock is turned in its locking or clockwise direction (as viewed in Fig. 10) locking arm 69 will be inside locking part 61 and therefore the cover will be locked against rearward motion with respect to the frame. Moreover, the tapered edge 70 of the locking arm 69 will have come into engagement with stud 63 and, because of its cam-like action in locking, will have forced itself and said cover seucrely down on the frame 51.

It will thus be seen that there is provided a device in which the several objects of this invention are achieved and which is well adapted to meet the conditions of practical use.

As various possible embodiments might be made of the above invention, and as various changes might be made in the embodiment above set forth, it is to be understood that all matter herein set forth or shown in the accompanying drawings is to be interpreted as illustrative and not in a limiting sense.

Having thus described my invention, I claim as new and desire to secure by Letters Patent:

1. In combination, a wall, a cylinder lock on said wall comprising a fixed cylinder lock barrel in which is rotatably mounted a key receiving cylinder member, a fixed cylindrical member on said wall adapted to receive a key, a sleeve rotatably mounted on said fixed cylindrical member and adapted to be rotated by a key inserted into said fixed cylindrical member, said sleeve comprising an annular portion formed with a notch, a bar, means to mount said bar for sliding movement into and out of said notch when said sleeve is in such angular position that the notch registers with said bar, and said annular portion being adapted to retain said bar from sliding movement in one direction when said notch is misaligned relative to said bar, spring means to move said bar in an opposite direction, a lever pivoted to said wall, said lever having one end engageable with the bar to move said bar in the direction of said sleeve upon rotating said lever in one direction of rotation against the tension of said spring means, means on said rotary cylinder member formed with a peripheral recess, and a lip formed on the other end of said lever engageable in the peripheral recess to lock said rotary clinder member against rotation when the notch on said sleeve is misaligned with respect to said bar, whereby when said sleeve is rotated by insertion of a key into said fixed cylindrical member to a position where said notch is aligned with said bar' said rotary cylindrical member may be rotated by a key inserted therein to push the lip out of said peripheral recess for rotating said lever in a direction for pushing one end of said bar into the notch in said sleeve to lock said sleeve against rotation.

2. In combination a wall, a cylinder lock on said wall comprising a fixed cylinder lock barrel in which is rotatably mounted a key receiving cylinder member, a fixed cylindrical member on said wall adapted to receive a key, a sleeve rotatably mounted on said fixed cylindrical member and adapted to be rotated by a key inserted into said fixed cylindrical member, said sleeve comprising an annular portion formed with a notch, a bar, means to mount said bar for sliding movement into and out of said notch when said sleeve is in such angular position that the notch registers with said bar, and said annular portion being adapted to retain said bar from sliding movement in the direction of said sleeve when said notch is misaligned relative to said bar, spring means to move said bar in an opposite direction, a lever pivoted to said wall, said lever having one end engageable with the bar to move said bar in said first direction upon rotating said lever in one direction of rotation against the tension of said spring means, latching means on said rotary cylinder member, and means on the other end of said lever engageable with said latching means to lock said rotary cylinder member against rotation when the notch on said sleeve is misaligned with respect to said bar, whereby when said sleeve is rotated by insertion of a key into said fixed cylindrical member to a position where said notch is aligned with said bar said rotary cylindrical member may be rotated by a key inserted therein to disengage said lever latching means for rotating said lever in a direction for pushing one end of said bar into the notch in said sleeve to lock said sleeve against rotation.

3. A mechanical interlock comprising a wall having plural apertures therein, a pair of key receivers disposed in coaxial relation to the respective wall apertures, one of said key receivers comprising a sleeve affixed to and perpendicularly extending from said wall, an axially bored cylinder rotatably disposed within said sleeve having one end thereof extending longitudinally therefrom, a radial flange secured to said extending cylinder end, a segmental member secured to said flange having a peripheral recess therein, the other of said key receivers comprising a cylinder affixed to and perpendicularly extending from said wall, a sleeve rotatably disposed on the periphery of a reduced diametric portion of said cylinder, a radial flange affixed to and rotatable with said latter sleeve having a peripheral notch therein, a slidable latching bar, means for slidably mounting said latching bar in the plane of said notched flange, a pivotal lever, means to pivotally mount said lever in spaced relation on said wall with one end of said lever being disposed in engagement with one end of said latching bar, spring means to retain said latching bar in engagement with said lever, and means formed on the other end of said lever adapted for latching engagement with the recess in said segmental member, whereby rotation of said notched flange to a position aligning said notch with said latching bar permits said lever to be displaced from latching engagement with said segmental member.

4. In combination, a mechanical interlock comprising a key receiving means, a cylinder lock barrel, a key receiving cylinder member rotatable in said cylinder lock barrel, said cylinder member being rotatable from a first angular position to a second angular position with respect to said cylinder lock barrel, means to prevent rotation of said cylinder member when in the second angular position, a rotatable sleeve on said key receiving means, said sleeve being provided with a notch and rotatable from a first angular position to a second angular position, a latching bar slidable from a first position out of engagement with said notch to a second position in engagement with said notch, said sleeve normally preventing sliding movement of said latching bar from its first to its second position, means interconnecting said latching bar to the means which prevents rotation of the cylinder member to prevent the rotation of said cylinder member from its second to its first angular position when said sleeve is in its first position, said interconnecting means being controlled by movement of the cylinder member from its second to its first angular position to move said latching bar into engagement with said notch when said sleeve is in its second angular position, and means controlled by the rotation of the cylinder member from its first to its second angular position to release said latching bar from said notch.

BENJAMIN COOPER.

References Cited in the file of this patent

UNITED STATES PATENTS

| Number | Name | Date |
|---|---|---|
| 537,311 | Schade | Apr. 9, 1895 |
| 2,126,333 | Kirk | Aug. 9, 1938 |
| 2,220,786 | Grainger | Nov. 5, 1940 |
| 2,336,936 | Johnson | Dec. 14, 1943 |